A. H. KENNEDY.
Machines for Shearing Sheep.
No. 5,477. Reissued July 1, 1873.
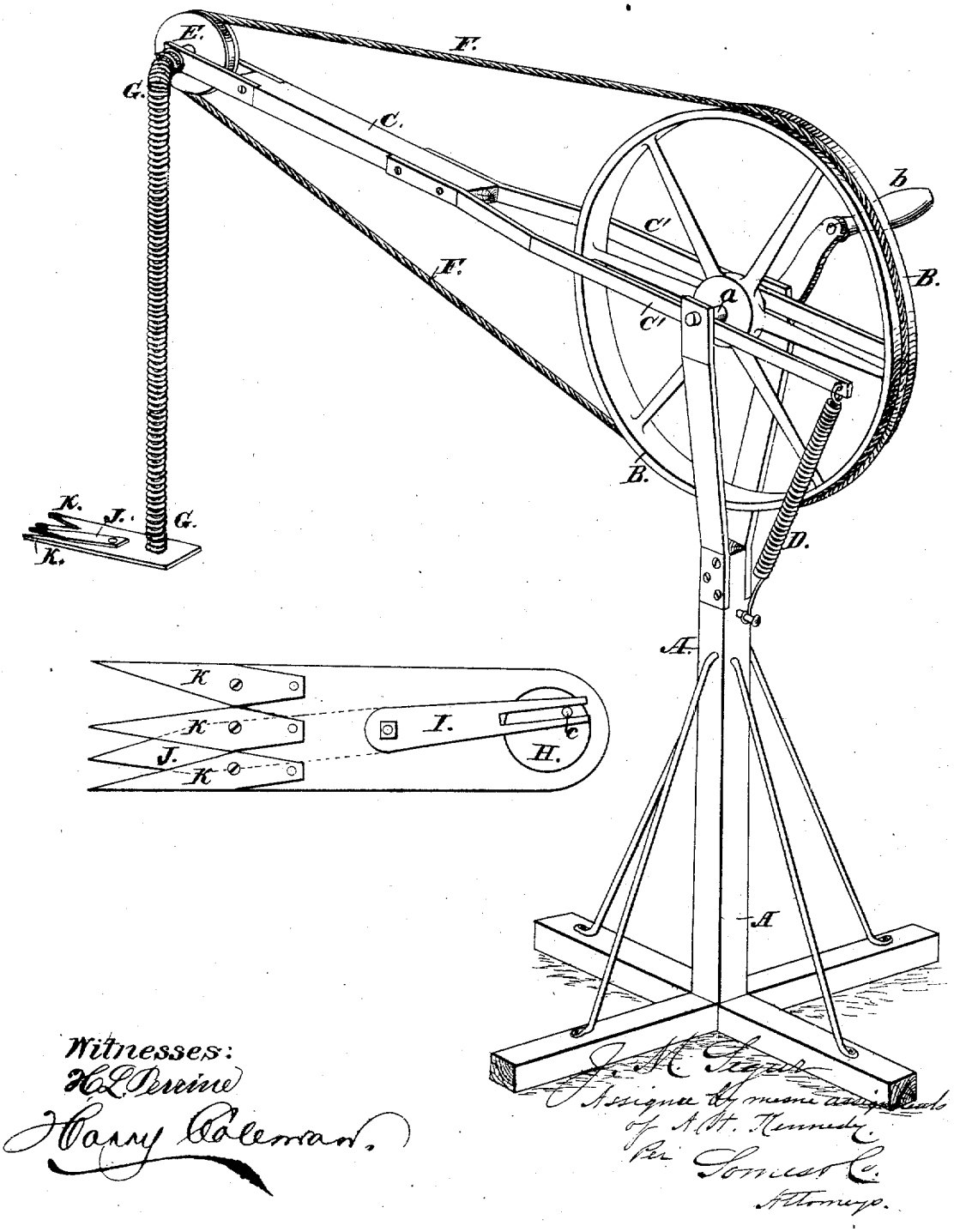
Witnesses:
H. L. Devine
Harry Coleman.
J. H. Steele
Assignee by mesne assignments
of A. H. Kennedy.
Per Somerset C.
Attorneys.
AM. PHOTO-LITHOGRAPHIC CO. N.Y. (OSBORNE'S PROCESS.)

UNITED STATES PATENT OFFICE.

ALBERT H. KENNEDY, OF BRUNSWICK, ASSIGNOR, BY MESNE ASSIGNMENTS, TO J. M. SEGUR, OF AKRON, OHIO.

IMPROVEMENT IN MACHINES FOR SHEARING SHEEP.

Specification forming part of Letters Patent No. 59,293, dated January 30, 1866; reissue No. 2,615, dated May 14, 1867; reissue No. 5,477, dated July 1, 1873; application filed June 13, 1873.

DIVISION B.

*To all whom it may concern:*

Be it known that ALBERT H. KENNEDY, of Brunswick, in the county of Medina and State of Ohio, assignor, by mesne assignments, to JOSEPH M. SEGUR, of Akron, in the county of Summit, in the same State, invented certain new and useful Improvements in Machines for Shearing Sheep, of which the following is a specification, reference being had to the accompanying drawings representing the machine in perspective and the shears detached, and on an enlarged scale.

The invention consists in the peculiar construction of the shears with relation to the operating mechanism to which they are connected, as hereinafter more specifically set forth.

A represents a stand or frame, upon which, in suitable supports, is hung a shaft, *a*, which shaft may be driven by a crank, *b*, or in any other equally well-known way. Upon this shaft *a* there is a pulley or belt-wheel, B, from which the power to drive the shears is taken. Upon the shaft *a* is hung the extended arm C, by means of the spanned or forked arms C′ C′, which arms are part and parcel of said extended arm, being forked or divided to afford a wider and better bearing on said shaft, and so as to embrace between said arms the belt or pulley wheel. One at least of the arms C′ extends beyond or rearward of the shaft *a* to which they are hinged, and is connected to a spring, D, which is also attached to the main frame or stand A, and serves to balance or hold in position the extended arm, while, at the same time, it allows it to turn on the shaft *a* and accommodate itself to the necessities of the operator. In bearings in the forward end of the extended and balanced arm there is a pulley, E, around which and around the pulley B on the main driving-shaft passes an endless belt, band, or cord, F, which gives motion to the pulley E. To the shaft or journal of the pulley E one end of a coiled-wire shaft, G, is connected, the other end of said shaft being connected to an eccentric or wrist-wheel, H, the wrist-pin *c* of which works in a slotted lever, I, connected to and which vibrates the moving shear-blade or cutter J with great rapidity of motion over the fingers K.

The very great flexibility of the coiled-wire shaft G allows the shears to be moved and turned in any direction while they are in working motion, even to turning them upside down, if necessary. The power or motion to drive the shears operates by the torsion of the shaft G, and the shaft may have one or more full turns or a half knot put in it without impairing its driving action, so that it may be shortened at pleasure, if too long or in the way, or made to extend to any reasonable distance.

In guiding and directing the shears, which the operator does with one hand while the other is free to hold the animal or move away clipped fleece, he can draw down the forward end of the hinged and balanced extended arm C by the shaft G, without impeding in the least the motion of the latter; and when the said shaft G tends to become slack by raising the cutters the arm will rise up again by force of the balancing or controlling device on the other side of its hinged support.

What is claimed as the invention is—

The cutting instrument or shears composed of the fingers K, blade J, slotted lever I, and wrist-wheel H *c*, in combination with the coiled-wire shaft G and the operating mechanism, substantially as and for the purpose set forth.

J. M. SEGUR,
*Assignee, by mesne assignments, of Albert H. Kennedy.*

Witnesses:
H. C. SANFORD,
S. EDGERTON.